May 19, 1970   R. W. TOLLE   3,512,664
TOWING HITCH CONSTRUCTION
Filed July 1, 1969   2 Sheets-Sheet 1
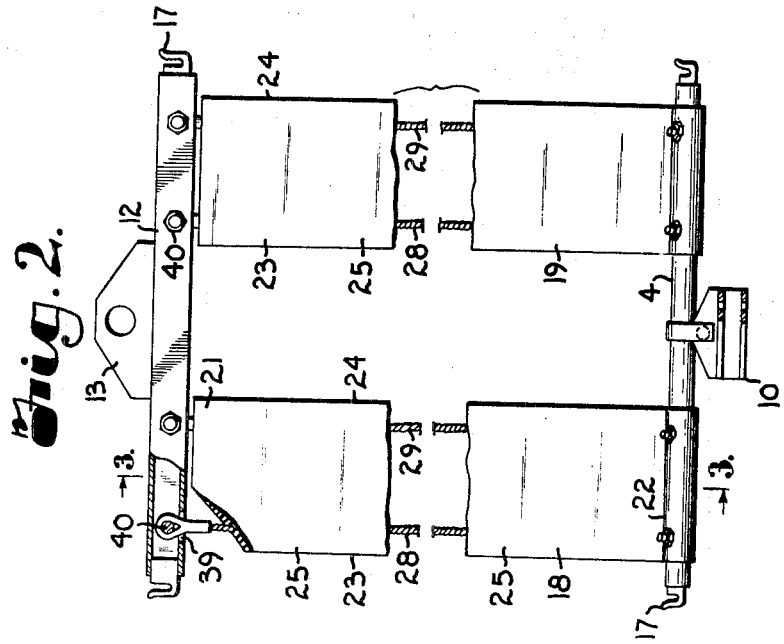
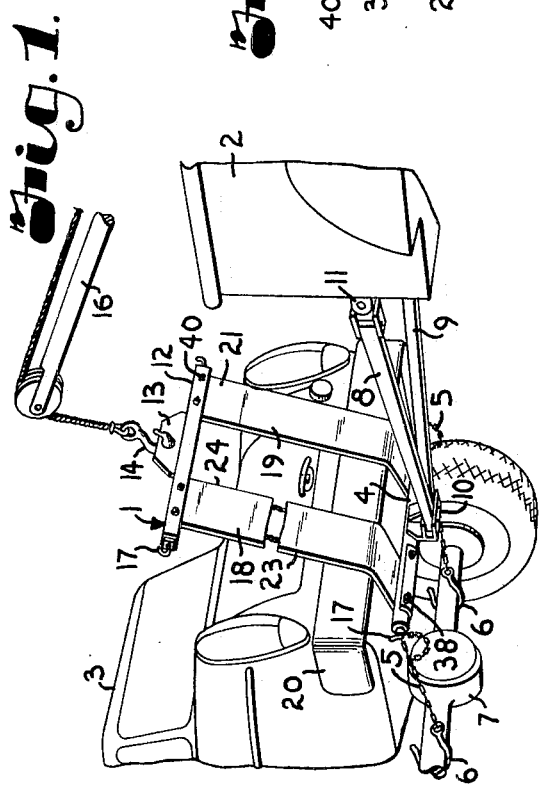
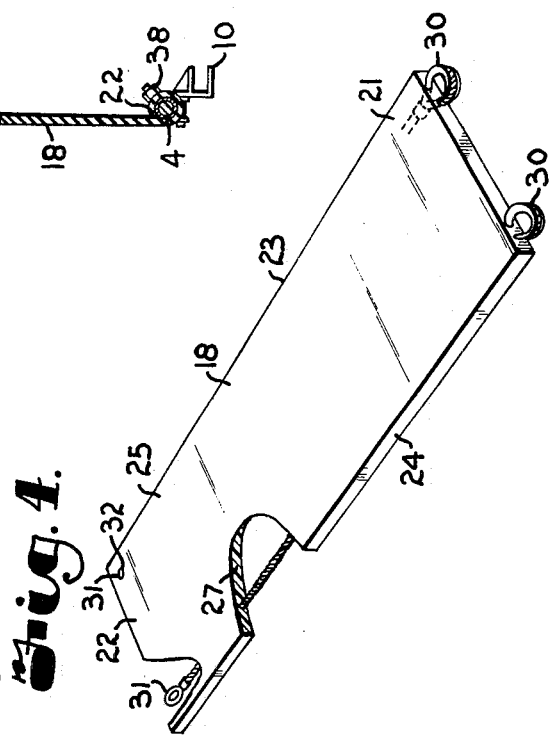
INVENTOR.
RUSSELL W. TOLLE
BY
Fishburn, Gold & Litman
ATTORNEYS May 19, 1970 R. W. TOLLE 3,512,664
TOWING HITCH CONSTRUCTION
Filed July 1, 1969 2 Sheets-Sheet 2
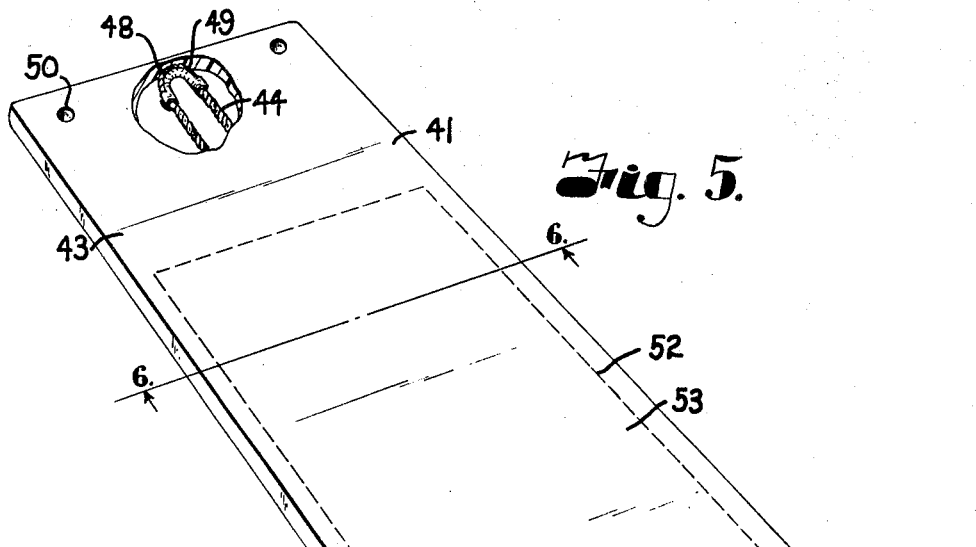
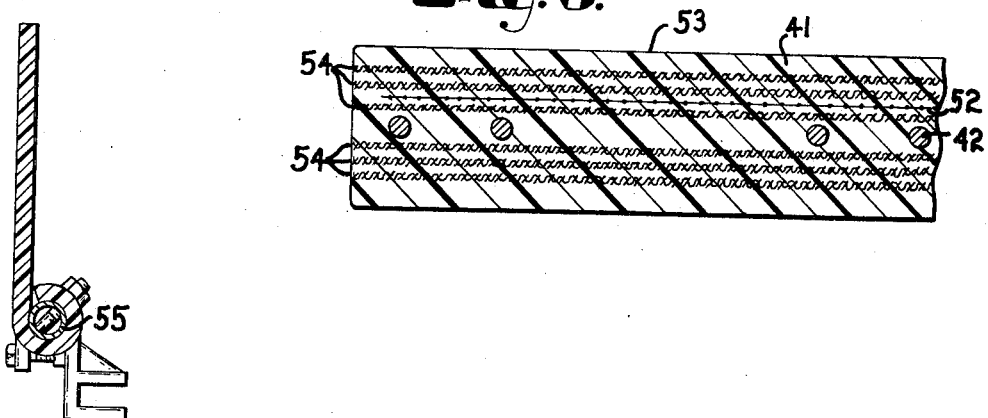
INVENTOR.
Russell W. Tolle
BY
Fishburn, Gold & Litman
ATTORNEYS United States Patent Office 3,512,664
Patented May 19, 1970

3,512,664
TOWING HITCH CONSTRUCTION
Russell W. Tolle, Rural Rte. 21,
Kansas City, Mo. 64119
Continuation-in-part of application Ser. No. 724,751,
Apr. 29, 1968. This application July 1, 1969, Ser.
No. 842,795
Int. Cl. B62d 53/04
U.S. Cl. 214—86                             8 Claims

ABSTRACT OF THE DISCLOSURE

Towing apparatus includes a pair of elongated, flexible, spaced apart suspension straps adapted to bend upwardly around a bumper on the towed vehicle, the straps each comprising a molded length of high toughness elastomer with high strength, flexible wire rope cables embedded therein and extending longitudinally thereof with embedded wire screen thereover, connections to upper and lower rigid, transverse bars on the apparatus being made through eyelets at both ends of the cables adjacent the ends of the straps; the eyelets being buried within the strap at least at one end thereof.

---

This application is a continuation-in-part of my copending application Ser. No. 724,751, filed Apr. 29, 1968.

This invention relates to vehicle towing apparatus and more particularly to improved straps and strap connections for such apparatus.

Wreckers or tow trucks now in use for towing disabled vehicles often use wide straps, rather than cables or chains, in direct lifting contact with the vehicles to avoid local marking or other damage to the vehicle. Such straps are usually made of heavy, fabric reinforced belting, but have a relatively short life because of exposure to sharp lower edges on bumpers and the like. It has been suggested to overcome this difficulty by using chains or cables covered by cushion pads with apertures therethrough for receiving the cables or chains, however, this has not been widely accepted because the pads have proved difficult to manipulate and retain in desired position. Tubular sleeves over the chains or cables have also been suggested, but generally do not provide sufficient force distribution.

In the practice of this invention, high strength, relatively small diameter cables are molded within wide, tough elastomer straps providing convenient, extensive, non-marring surfaces upon which to raise the vehicle without danger of accident due to strap breakage through cutting.

The principal objects of the present invention are: to provide improved towing apparatus which is safe and convenient in use without a tendency to mar the vehicle towed; to provide such apparatus which offers the advantages of reinforced belting without the dangers inherent therewith; to provide such towing apparatus which is long lived under adverse conditions; and to provide such apparatus which is inexpensive to manufacture and easily replaced when worn.

Other objects and advantages of this invention will become apparent from the following description taken in connection with the accompanying drawings wherein are set forth by way of illustration and example certain embodiments of this invention.

FIG. 1 is a fragmentary perspective view showing towing apparatus embodying this invention in operation between a tow truck and a vehicle being towed.

FIG. 2 is a front elevation on a larger scale showing the improved straps, anchor and header bars of FIG. 1, with portions broken away from a strap to show the cables embedded therein.

FIG. 3 is a cross-sectional view taken on the line 3—3, FIG. 2, particularly showing details of the connections between the straps and bars.

FIG. 4 is a perspective view on a further enlarged scale showing a strap with portions broken away to reveal details of construction.

FIG. 5 is a perspective view on a still further enlarged scale showing a modified form of strap embodying this invention with portions broken away to reveal details of construction.

FIG. 6 is an enlarged fragmentary cross-sectional view taken on the line 6—6, FIG. 5, illustrating interior construction of the strap of FIG. 5.

FIG. 7 is a cross-sectional view similar to FIG. 3 but showing the modified strap of FIG. 5 connected between anchor and header bars.

Referring to the drawings in more detail:

The reference numeral 1 generally indicates towing apparatus embodying this invention. The apparatus 1 is shown in operable relation between a tow truck 2 and a towed vehicle 3. The apparatus 1 comprises an elongated rigid lower or anchor bar 4 adapted to be positioned beneath the vehicle 3, adjacent a bumper, and having devices, such as chains 5 and hooks 6, for attaching the bar to a secure portion of the vehicle, in this example, the rear drive housing 7.

A pair of tow bars 8 and 9 are pivotally connected to the anchor bar 4 through a connecting bracket 10 and extend forwardly and laterally for connection to the towing vehicle 2 through connectors 11 for holding the vehicle 3 in spaced relation to the tow truck 2. An elongated, rigid, hollow header bar 12 forms part of the apparatus 1 and has a central eyelet member 13 for receiving a hook 14 forming part of lifting structure 16 carried by the tow truck 2. Suitable side hooks 17 are provided on the ends of both the header bar 12 and anchor bar 14 to receive and secure a chain when desired.

Referring more particularly to this invention, a pair of elongated, flexible, parallel, spaced apart suspension straps 18 and 19 comprise part of the towing apparatus 1 and in operation bend upwardly around the bumper 20 on the towed vehicle 3. The straps 18 and 19, each have an upper end 21, a lower end 22, side edges 23 and 24 and extensive front and rear surfaces 25 and 26. The straps 18 and 19 are respectively comprised of a molded integral length of high toughness elastomer 27, for example, styrene butadiene rubber, with a pair of parallel, flexible, spaced apart wire cables 28 and 29 embedded longitudinally therein between the surfaces 25 and 26.

The cables 28 and 29 preferably are of the highly flexible type commonly used in aircraft and, by way of example, have a diameter of $3/16$ inch and a test strength of about 4,000 lbs. The diameter of the cables desirably is roughly 25% to 50% of the thickness of the straps 18 and 19 between the surfaces 25 and 26, making the thickness about $1/2$ inch. The cables 28 and 29 each terminate at opposite ends thereof in upper and lower connecting eyelets 30 and 31. The lower eyelets 31 are substantially buried in the elastomer 27 adjacent the lower end 22 and passageways 32 extend through the straps 18 and 19 and eyelets 31 between the front and rear surfaces 25 and 26. The upper eyelets 30 partially project from the upper edges 21 as best illustrated in FIG. 4.

In connecting the straps 18 and 19 to the anchor bar 4, the lower ends 22 of the straps are partially wrapped about the bar 4 and threaded studs 37, rigidly projecting radially from the anchor bar 4, are received through each of the passageways 32. A nut and washer fastener 38 is used in conjunction with each of the studs 37 for securing the lower edges 22 to and against the anchor bar 4.

The header bar 12 is preferably in the shape of a square tube and slots 39 are provided in the underside thereof for receiving the upper eyelets 30. Transverse pins or bolts 40 extend horizontally through the header bar and the upper eyelets 30, connecting the straps 18 and 19 thereto; however, there may be no direct connection between the elastomer and the header bar as best shown in FIG. 2.

A modified form of strap, designated 41, is illustrated in FIGS. 5–7 and is characterized by having three cables 42 extending longitudinally within the strap body 43. The cables 42 are respectively in the configuration of an elongated loop 44 formed by joining the ends of the cables with a suitable compression connector 45, whereupon each cable provides a pair of spaced apart, parallel tensile members 46. The cable portions at the opposite ends 47 and 48 of the loops 44 form cable connecting eyelets which are preferably protected by half-round protective eyelets 49. The eyelets 49 are respectively coincident with passageways 50, corresponding to the passageways 32, FIG. 4, the eyelets 49 and cables 42 being buried in the elastomer 51 of the body 43.

A layer of wire screen 52, such as .020 inch, ⅛ mesh, is embedded in the body 43 between the cables 42 and the strap front surface 53 where the latter will contact the bumper of the vehicle. Several layers of fabric 54, such as the nylon fabric commonly found in automobile tire casings, are also embedded in the body 43 above the screen 52, below the cables 42 and, preferably, a layer of fabric 54 is also positioned between the cables and the screen, FIG. 6.

The modified form of strap 41 is connected to the anchor bar 55 and header bar 56 as described above in connection with the straps 18 and 19, except that elongated slots 57 are provided to receive the entire end of the strap thereinto rather than the slots 39, FIG. 2, which only receive the eyelets 30, 31.

It has been found that the above-described construction produces the desired wide area support for the towed vehicle and yet the body of the straps need not be relied upon for high strength. Thus, the advantages of strap support are provided without the dangers formerly inherent in the use thereof.

It is to be understood that, although certain forms of this invention have been illustrated and described, it is not to be limited thereto.

What I claim and desire to secure by Letters Patent is:

1. A suspension strap for use in towing apparatus having an anchor bar adapted to be positioned beneath a vehicle to be towed and a header bar adapted for connection to lifting means carried by such towing vehicle, said strap having an upper end and a lower end and opposed front and rear surfaces, said strap comprising;
   (a) a length of molded elastomer with a pair of flexible, spaced apart wire rope cables embedded therein between said surfaces and extending longitudinally thereof, said cables each having opposite ends terminating adjacent said strap ends,
   (b) said cable ends each terminating in connecting eyelets for attaching to said bars,
   (c) said eyelets being at least partially buried in said elastomer.
2. The suspension strap as set forth in claim 1 wherein:
   (a) at least one of said connecting eyelets is buried in said elastomer, and
   (b) a passageway extends between said front and rear surfaces through said buried eyelet.
3. The suspension strap as set forth in claim 1 wherein:
   (a) said pair of cables comprises at least one cable formed into an elongated loop having an end terminating adjacent one of said strap ends and forming one of said connecting eyelets.
4. The suspension strap as set forth in claim 3 wherein:
   (a) at least one of said connecting eyelets is buried in said elastomer, and
   (b) a passageway extends between said front and rear surfaces through said buried eyelet.
5. The suspension strap as set forth in claim 3 wherein:
   (a) said loop is a closed loop having opposite ends terminating respectively adjacent said strap ends.
6. The suspension strap as set forth in claim 1 including:
   (a) a layer of wire screen embedded in said elastomer between said cables and said front surface.
7. The suspension strap as set forth in claim 1 wherein:
   (a) each of said connecting eyelets is buried in said elastomer, and
   (b) a passageway extends between said front and rear surfaces through each of said eyelets.
8. Towing apparatus comprising:
   (a) an elongated rigid anchor bar adapted to be positioned and retained beneath a vehicle to be towed, an elongated rigid header bar adapted for connection to lifting means carried by a towing vehicle,
   (b) a pair of elongated, flexible, spaced apart suspension straps adapted to bend upwardly around a bumper on the towed vehicle, said straps each having an upper end and a lower end and front and rear surfaces,
   (c) said straps each comprising a molded length of elastomer with a pair of flexible, spaced apart wire rope cables embedded therein between said surfaces and extending longitudinally thereof,
   (d) said cables having a diameter approximately 25% to 50% of the thickness of said straps between said surfaces and terminating in upper and lower connecting eyelets at opposite ends thereof, said lower eyelets being substantially buried in said elastomer adjacent said strap lower ends, passageways through said straps between said front and rear surfaces and through each of said lower eyelets, said upper eyelets partially projecting from said strap upper ends, said strap lower ends being partially wrapped about said anchor bar,
   (e) studs projecting laterally from said anchor bar through each of said passageways, slots in said header bar for receiving said upper eyelets into said header bar, and transverse studs extending through said header bar, and upper eyelets for connecting said straps to said header bar.

References Cited

UNITED STATES PATENTS 2,598,921   6/1952   Knudsen _____ 294—74
2,913,131   11/1959  Holmes _____ 214—86

A. J. MAKAY, Primary Examiner

U.S. Cl. X.R.
294—74